United States Patent
McCorkendale

(10) Patent No.: US 9,614,826 B1
(45) Date of Patent: Apr. 4, 2017

(54) SENSITIVE DATA PROTECTION

(71) Applicant: Symantec Corporation, Mountain View, CA (US)

(72) Inventor: Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 176 days.

(21) Appl. No.: 14/282,856

(22) Filed: May 20, 2014

(51) Int. Cl.
*G06F 21/00* (2013.01)
*H04L 29/06* (2006.01)
*G06F 21/60* (2013.01)
*G06F 21/62* (2013.01)

(52) U.S. Cl.
CPC .............. *H04L 63/08* (2013.01); *G06F 21/60* (2013.01); *G06F 21/62* (2013.01); *G06F 21/6218* (2013.01)

(58) Field of Classification Search
CPC ...... G06F 21/60; G06F 21/62; G06F 21/6218; G06F 21/6227; G06F 21/6236; G06F 21/6245
See application file for complete search history.

(56) References Cited

U.S. PATENT DOCUMENTS

| 2007/0162419 A1* | 7/2007 | Ahn | G06F 17/30091 |
| 2007/0192630 A1* | 8/2007 | Crane | G06F 21/6245 713/193 |
| 2010/0332454 A1* | 12/2010 | Prahlad | G06F 17/3002 707/654 |
| 2013/0226876 A1* | 8/2013 | Gati | G06F 17/30079 707/652 |

OTHER PUBLICATIONS

Georges, Logging in Automatically and Other Windows 8.1 Tweaks, available from http://www.georges.nu/blog/2012/09/keeping-all-your-files-synced-across-all-your-cloud-storage-providers/, Oct. 22, 2013.
Averail, Averail App, available from http://www.averail.com/, 2013.

\* cited by examiner

*Primary Examiner* — Edward Zee
(74) *Attorney, Agent, or Firm* — Holland & Hart LLP

(57) ABSTRACT

A computer-implemented method for protecting sensitive data is described. In one embodiment, the method includes identifying data stored at a first storage system. The identified data is classified as sensitive data. The method includes copying at least a portion of the identified sensitive data from the first storage system, transferring the copied portion of the identified sensitive data from the first storage system to a file stored at a second storage system, and storing a virtual symbolic link at the first storage system. The virtual symbolic link includes information regarding the file stored at the second storage system.

15 Claims, 7 Drawing Sheets

SENSITIVE DATA PROTECTION

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The widespread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in data storage. For example, advancements in computing device processing, computer network availability, and data storage reliability have generated multiple cloud storage systems. However, data stored in a typical cloud storage system may fail to provide sufficient data protection.

SUMMARY

According to at least one embodiment, a computer-implemented method for protecting sensitive data is described. In one embodiment, the method may include identifying data stored at a first storage system. The data may be classified as sensitive data. The method may include copying at least a portion of the identified sensitive data from the first storage system and transferring the copied portion of data to a file stored at a second storage system and storing a virtual symbolic link at the first storage system. The virtual symbolic link may include information regarding the file stored at the second storage system. In some cases, the virtual symbolic link may include information regarding a type of file associated with the identified sensitive data. In some cases, the virtual symbolic link may be associated with a file with a custom file type. Accordingly, an application may be registered as a handler of the custom file type.

In some embodiments, credentials to one or more cloud storage systems may be acquired. The first storage system may be among the one or more cloud storage systems. The acquired credentials may be used in conjunction with a public application programming interface (API) from the one or more cloud storage systems to access content on the one or more cloud storage systems. The content on the one or more cloud storage systems may be scanned to identify files containing sensitive data. In one embodiment, upon accessing the content from each of the one or more cloud storage systems, an aggregated view of the accessed content may be displayed.

In one example, the content on the one or more cloud storage systems may be periodically scanned to identify new sensitive data. Creation of a new file at one of the one or more cloud storage systems may be detected by various methods. Likewise, modification of an existing file at one of the one or more cloud storage systems may be detected. In some cases, new and/or modified existing files may be detected via a notification callback API provided by a cloud storage system. Accordingly, sensitive data in a new file and/or sensitive data in a modified existing file may be detected in real-time. In some cases, at least a portion of the identified data that is transferred from the first storage system to the second storage system may be deleted from the first storage system. Thus, an entire file and/or a portion of a file may be deleted from the first storage system.

A computing device configured for protecting sensitive data is also described. The device may include a processor and memory in electronic communication with the processor. The memory may store instructions that are executable by the processor to identify data stored at a first storage system. The data may be classified as sensitive data. The memory may store instructions that are executable by the processor to copy at least a portion of the identified data from the first storage system, transfer the copied portion of the identified data from the first storage system to a file stored at a second storage system, and store a virtual symbolic link at the first storage system. The virtual symbolic link may include information regarding the file stored at the second storage system.

A computer-program product for protecting sensitive data is also described. The computer-program product may include a non-transitory computer-readable medium that stores instructions. The instructions may be executable by a processor to identify data stored at a first storage system. The data may be classified as sensitive data. The memory may store instructions that are executable by the processor to copy at least a portion of the identified data from the first storage system, transfer the copied portion of the identified data from the first storage system to a file stored at a second storage system, and store a virtual symbolic link at the first storage system. The virtual symbolic link may include information regarding the file stored at the second storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
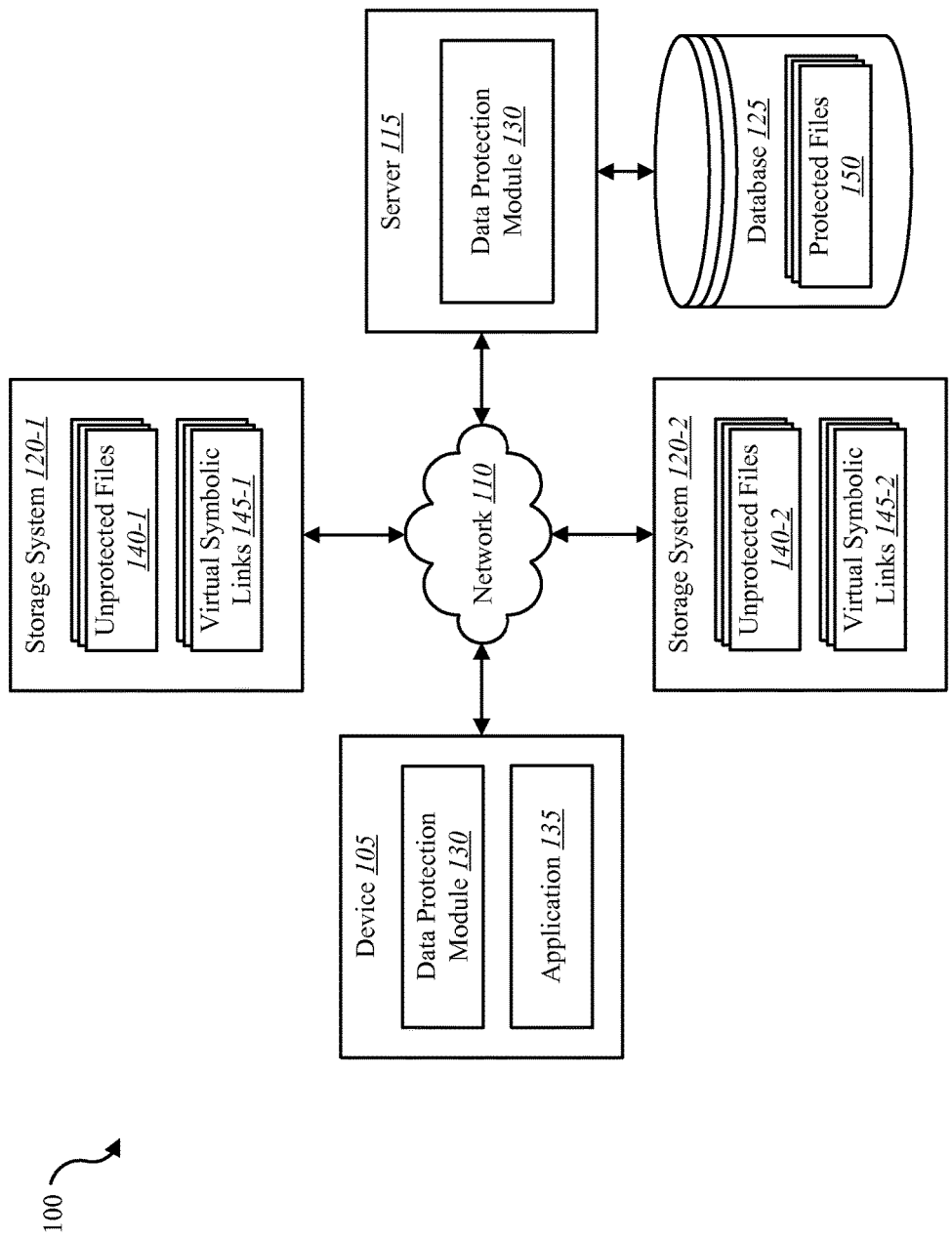
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to protecting sensitive data. More specifically, the systems and methods described herein relate to protecting sensitive data stored on a cloud storage system. Examples of cloud storage systems include Google Drive, DropBox, Amazon Cloud Storage, iCloud, SkyDrive, OneDrive, Box.net, SugarSync, etc. Cloud services such as these are popular because they make it convenient to share documents between different users or for the same user across any machine with Internet access. However, company policies often prohibit employees from placing work related documents in such services because the data protection is not controlled by the company and because handling documents on these cloud storage platforms may compromise confidential data. Accordingly, the present systems and methods provide both convenient personal usage as well as convenient, secure, and employer-controlled usage. Additionally, because multiple corporate documents are presently stored on the conventional, insecure cloud storage platforms, the present systems and methods provide ways to find and move sensitive data from the insecure cloud storage platforms onto a customizable secure cloud storage platform.

The present systems and methods include registering an application as a handler (i.e., an open-in target) for a custom file type. Files of this custom type may contain a reference to a secure cloud storage location. Thus, files of this custom type may represent a virtual symbolic link from an insecure cloud storage system to a location on a secure cloud storage system.

Each of the conventional cloud storage providers (e.g., DropBox, Box.Net, SkyDrive, Google Drive, etc.) may make one or more application programming interfaces (APIs) publically available for third-party use. Thus, upon acquiring a user's credentials for a particular conventional cloud storage provider, the present systems and methods may use a publically available API from the particular cloud storage provider to browse, scan, read, write, modify, and generally perform any available file system operation in relation to the accessible content. Accordingly, the present systems and methods may use the public APIs and the acquired credentials to search the contents of insecure cloud storage providers, identify documents containing sensitive data, move the identified documents into the secure storage location, and replace the original content with a linking file, a file that dynamically links to the sensitive data moved to the secure storage location. In some cases, the process of identifying documents containing sensitive data may be based on a user policy, an administrator policy, a user configuration, an administrator configuration, keyword search, machine learning, etc. The contents of the linking file may indicate the new location for the data within the secure storage location, thus creating a virtual symbolic link from the insecure storage system to the secure cloud storage location.

In some cases, the present systems and methods may present an aggregated view of multiple conventional cloud storage services. In some cases, a virtual drive may be mounted on a file system of a particular operating system (e.g., Explorer in WINDOWS®, Finder in MAC OS®, etc.). The files from multiple conventional cloud storage services may be arranged and displayed as folders and files of the mounted virtual drive. In one example, a virtual file system at a virtual root may be presented, having sub-trees as roots for each of the different cloud storage services. The present systems and methods may enable a user to simultaneously browse the aggregated view of multiple insecure cloud storage services and manually identify files containing sensitive information. The user may be enabled to initiate an action to move and/or copy selected files from the insecure locations to the secure storage location. The system may automatically replace the transferred and/or copied files with a virtual symbolic link that points to the new location within the secure storage location.

In one embodiment, the present systems and methods may perform automatic scans of the insecure cloud storage services to identify files containing sensitive information, automatically move those files from the insecure storage service to a secure storage location, and replace the transferred files with virtual symbolic link files. In some cases, the present systems and methods may periodically scan the insecure cloud storage services for new documents, analyze the new documents, identify files containing sensitive information among the new files, automatically move the identified files from the insecure storage service to a secure storage location, and replace the transferred files with virtual symbolic link files.

The conventional cloud storage providers may make callback APIs available to third-party programmers. Thus, in one embodiment, the present systems and methods may register callback APIs to receive real-time notifications regarding new and/or modified content and move the identified content to a secure storage location. Accordingly, the present systems and methods may discover and move sensitive data to secure storage with a minimum window of exposure time on the insecure storage system.

FIG. 1 is a block diagram illustrating one embodiment of an environment 100 in which the present systems and methods may be implemented. In some embodiments, the systems and methods described herein may be performed on a client device (e.g., device 105). The environment 100 may include device 105, network 110, server 115, storage systems 120-1 and 120-2, and database 125.

Examples of the device 105 include mobile devices, smart phones, personal computing devices, computers, laptops, desktops, servers, a set top box providing access to media content, gaming consoles, home automation systems, data storage systems, and generally any computing device able to connect to a data communication network. Examples of server 115 may include a cloud server, a data server, a corporate server, a home automation server, etc.

In some configurations, device 105 may include a data protection module 130 and an application 135. Examples of application 135 may include any combination of a program installed on a server, a program installed on a personal computer, a mobile application installed on a mobile computing device, a web browser, a web-based application (e.g., any combination of JavaScript, hypertext markup language (HTML), and cascading style sheets (CSS)), etc. In some embodiments, application 135 may be installed on device 105 to enable a user of device 105 to interface with a function of server 115, storage systems 120, database 125, and/or data protection module 130. For example, application 135 may allow device 105 to interface with the data protection module 130 on another device such as on server 115. In some cases, server 115 may include an application similar to application 135.

In some embodiments, device 105 may communicate with server 115 via network 110. Examples of network 110 may include cloud networks, local area networks (LAN), wide area networks (WAN), virtual private networks (VPN), wireless networks (using 802.11, for example), cellular networks (using 3G and/or LTE, for example), etc. In some configurations, the network 110 may include the Internet.

In some embodiments, storage systems 120 may each include unprotected files 140 and virtual symbolic links 145. In one example, storage systems 120 represent cloud storage systems and/or file hosting services such as Dropbox, Sky-Drive, OneDrive, Google Drive, iCloud, Amazon Cloud Drive, MediaFire, Zoolz, OpenDrive, JustCloud, Box, SugarSync, and the like. In some cases, each unprotected file 140 may represent a file stored on a particular cloud storage system that has not been protected via one or more operations of data protection module 130. Each virtual symbolic link 145 may be associated with a linking file. The linking file may include information regarding an unprotected file 140 that has been protected via one or more operations of data protection module 130. In some cases, each virtual symbolic link 145 may be associated with a list of protected files.

As illustrated, server 115 may be coupled to database 125. In some cases, database 125 may include protected files 150. In one embodiment, protected files 150 may include copies of certain files stored on storage systems 120. In one example, at least one virtual symbolic link 145 stored on storage system 120-1 and/or 120-2 may link to at least one protected file 150 stored in database 125. Accordingly, protected files 150 may include copies of selected files from storage systems 120.

In some embodiments, device 105 and/or server 115 may each include a data protection module where at least a portion of the functions of data protection module 130 are performed separately and/or concurrently on device 105 and/or server 115. Data protection module 130 may be configured to protect data stored on storage systems 120. In one example, data protection module 130 may acquire access to data stored on storage systems 120. Thus, data protection module 130 may scan the unprotected files 140 on storage systems 120, and based on the scan, data protection module 130 may identify a file among the unprotected files 140 that includes sensitive data. Accordingly, data protection module 130 may copy at least a portion of the sensitive data from the identified file to a protected file 150 on database 125. Additionally, data protection module 130 may generate a virtual symbolic link 145. In some cases, the virtual symbolic link 145 may include a file that contains information regarding the protected file 150 stored on database 125 and/or information regarding a file stored on storage systems 120. Data protection module 130 may store the generated virtual symbolic link 145 on at least one of the storage systems 120. In some cases, data protection module 130 may replace an original file at storage systems 120 with a virtual symbolic link 145. Further details regarding the data protection module 130 are discussed below.

Figure 2:
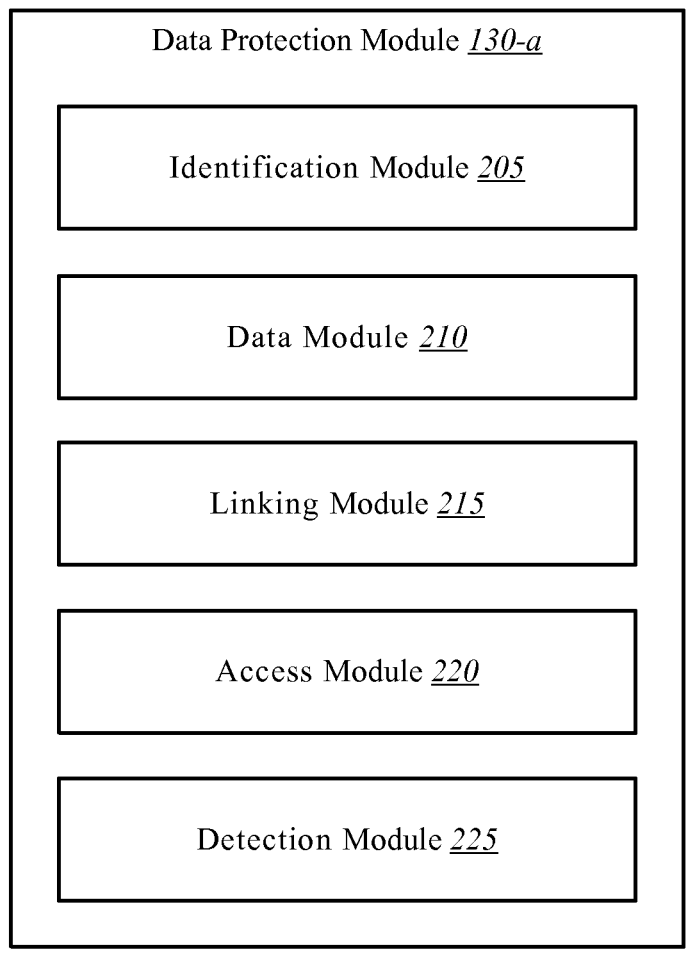
FIG. 2 is a block diagram illustrating one example of a data protection module.

FIG. 2 is a block diagram illustrating one example of a data protection module 130-*a*. Data protection module 130-*a* may be one example of data protection module 130 depicted in FIG. 1. As depicted, data protection module 130-*a* may include identification module 205, data module 210, linking module 215, access module 220, and detection module 225. In one embodiment, at least one aspect of data protection module 130-*a* may include software and/or hardware elements of a network data storage system. For example, the data protection module 130-*a* may be part of a cloud storage application configured to store data in a secured data environment.

In one embodiment, identification module 205 may identify data stored at a first storage system (e.g., storage systems 120-1 and/or 120-2). In some cases, the identified data may be classified as sensitive data. For example, identification module 205 may identify files on the first storage system that contain business secrets, trade secrets, confidential information, etc. In some embodiments, data module 210 may copy at least a portion of the identified sensitive data from the first storage system and transfer the copied portion of the identified sensitive data from the first storage system to a file at a second storage system. For example, data module 210 may copy a portion of a first file at a first storage system and transfer the copied portion of the first file to a second file at a second storage system. Additionally, or alternatively, data module 210 may copy an entire file, bit by bit, and transfer the copied data to a second storage system. In some cases, data module 210 may transfer the original file at the first storage system and move the original file to the second storage system. In one example, data module 210 may delete at least a portion of the identified sensitive data from the first storage system. Accordingly, data module 210 may delete only a portion of a file and/or data module 210 may delete an entire file from the first storage system.

In some embodiments, the second storage system may include a secure cloud storage system such as NORTON ZONE®. The second storage system may provide data protection and security features that other conventional storage systems, including the first storage system, do not provide, protecting data in-use (endpoint actions), in-motion (network traffic), and at-rest (data storage). For example, data protection module 130-*a* may perform a virus scan upon upload of data to the second storage system, a virus scan on share, a virus scan on download, etc. Additionally, in conjunction with the second storage system, the data protection module 130-*a* may implement a key encryption system based on SYMANTEC® Multiblind Key Encryption and/or SYMANTEC® Encryption Management Server (SEMS). Such a key encryption system may enable corporations to manage their own encryption keys, retain control over their sensitive data, and provide data protection and data security that surpasses that of conventional cloud storage systems.

In some embodiments, linking module 215 may store a virtual symbolic link at the first storage system. For example, "file.doc" may be stored at a first storage system. In one instance, data module 210 may perform a bit-by-bit copy of "file.doc" and transfer the copied data to a second storage system. In another instance, data module 210 may move "file.doc" from the first storage system to the second storage system. In some embodiments, data module 210 may delete "file.doc" from the first storage system. For example, once "file.doc" is copied to the second storage system, data module 210 may delete "file.doc" at the first storage location. In place of the deleted file, linking module 215 may store a virtual symbolic link at the first storage system.

In some cases, the virtual symbolic link may include information regarding the file at the second storage system and/or a file associated with the identified sensitive data. In some embodiments, the virtual symbolic link may include a linking file. The linking file may include a custom file type in some cases. Accordingly, linking module 215 may be configured to register an application (e.g., application 135) as a handler of the custom file type, creating a mapping between the custom file type and the application. Thus, the application may be registered to handle file system events associated with a file of this custom file type, including file system commands such as open, read, write, modify, etc. For instance, linking module 215 may create at least one registry key containing an association for the custom file type and the application as the handler for each linking file that is of this custom file type. In some embodiments, the linking file may include information regarding the target location, the target file, the original location, the original file, etc.

In one embodiment, the linking file may include information regarding a type of file associated with the identified sensitive data. Upon determining the file Text.doc contains sensitive data, at least a portion of Text.doc may be transferred to a secure location. In one example, Text.doc may be stored on Google Drive. Having gained access to the Google Drive account containing Text.doc, data module 210 may perform a bit-by-bit copy of Text.doc and store this copy at a secure storage system, such as NORTON ZONE® cloud storage. In some cases, the file may be transferred based on a public application programming interface (API) provided by the source storage system, which in this example is Google Drive. Accordingly, with access to this same Google Drive account, linking module 215 may store a virtual symbolic link in place of the original Text.doc via the public API.

In some cases, data module 210 may delete Text.doc from the Google Drive account. Thus, in the place of this deleted file, linking module 215 may store a linking file, which, in some cases, may use a custom file type. For instance, the linking file may be associated with a proprietary ".secure" file type as one example. In some embodiments, the custom file type may be associated with an internet media type such as a multipurpose internet mail extensions (MIME) type. In one example, the custom file type may be associated with a uniform type identifier, and may be associated with a reverse domain name notation such as com.norton.zones. Accordingly, linking module 215 may replace the original content with a file of a new MIME type, whose contents indicate a new location for the data within a secure storage location, thus creating a "virtual symbolic link" from the insecure storage location to the secure storage location. Thus, via data protection module 130-a, an application such as application 135 may be given access to the first storage system via proper credentials and in conjunction with one or more publically-available APIs. Accordingly, when a user selects the virtual symbolic link to open it, the application, registered to handle such files and given the proper access, may handle the request. Thus, the application 135 may interpret the data embedded in the virtual symbolic link such that the copy of "file.doc" stored at the second storage location is seamlessly accessed as if "file.doc" were still at the first storage system. Accordingly, the application may open "file.doc" stored on the second storage system based on the virtual symbolic link and present the contents of this file to the user. In some cases, the user may access "file.doc" directly at the second storage system.

In some embodiments, linking module 215 may preserve in association with the linking file, information regarding the source file. For example, linking module 215 may preserve the name of an original source file, "Text.doc," by naming the linking file "Text.doc.secure." Additionally, or alternatively, linking module 215 may store information regarding the original source file within the linking file. In some cases, the linking file may include information regarding the target location and target file. Thus, the linking file may contain a reference to the copied file in the form of an absolute or relative path. Accordingly, after copying Text.doc from the Google Drive account, storing this copy at a secure storage location and replacing the original file with a linking file, a user of this Google Drive account may select the linking file Text.doc.secure, through which the information within the linking file provides a computing system the information needed to resolve the pathname to the copy of Text.doc stored at the secure storage location. Thus, when a user selected Text.doc.secure, the linking file would instruct the computing system to seamlessly open Text.doc at the secure storage location as if the user is opening the original file at the original cloud storage system. In some cases, the linking file may include information that enables the computing system to access the secure storage location. For example, the linking file may include identifying information or credential information associated with the secure storage location.

In one embodiment, access module 220 may acquire credentials to one or more cloud storage systems. The first storage system may be among the one or more cloud storage systems. Access module 220 may use the acquired credentials, in conjunction with a public API from the one or more cloud storage systems, to access content on the one or more cloud storage systems. For example, access module 220 may acquire credentials to a Google Drive account. Upon acquiring these credentials, access module 220 may use one or more APIs provided by Google Drive to access the data of the associated account. Likewise, the access module 220 may acquire credentials to an additional cloud storage account. For example, access module 220 may acquire credentials to a DropBox account, in which case both the Google Drive account and the DropBox account are associated with a common user. Upon acquiring credentials to the DropBox account, access module 220 may use one or more APIs provided by DropBox to access the data of the DropBox account. In one embodiment, upon accessing the content from each of one or more cloud storage systems, access module 220 may display an aggregated view of the accessed content. Accordingly, access module 220 may display content from both the Google Drive account and the DropBox account in a single, common viewing area. In some cases, data module 210 may indicate which files from the one or more accounts have been securely transferred to the secure storage location, and which files remain unprotected. Thus, access module 220 may provide a secure user interface that enables a user to view which files have been protected, which files have not been protected, and which of the unprotected files ought to be protected. The secure user interface may enable a user to manually transfer file data to the secure cloud storage, and to configure settings that enable the system to identify files containing sensitive data dynamically and automatically (i.e., without human intervention).

In one embodiment, identification module 205 may scan the content on one or more cloud storage systems to identify files containing sensitive data. Identification module 205 may use publically-available APIs from one of the one or more cloud storage systems to scan data associated with a user's account and identify particular documents, thus enabling data protection module 130-a to transfer contents of identified documents to a secure cloud storage and replace the original content with a virtual symbolic link. In some cases, identification module 205 may inspect the content of a file on the one or more storage systems. Identification module 205 may perform analysis on the content such as character analysis, word string analysis, and so forth, to detect sensitive data within the file. Additionally, or alternatively, identification module 205 may perform analysis on filenames, file creation dates, file owner information, information indicating an association between a file and a company, meta-data associated with each file, etc., to determine whether the file contains sensitive data. Identification module 205 may implement hash algorithms, fuzzy hash algorithms, and machine-learning algorithms to analyze file content to detect sensitive data. In one example, identification module 205 may implement data leakage prevention (DLP) scanning and/or content monitoring and filtering (CMF) to identify files containing sensitive data. In one embodiment, identification module 205 may periodically scan the content on the one or more cloud storage systems to identify new sensitive data.

In one embodiment, detection module 225 may detect creation of a new file at one of the one or more cloud storage systems. Additionally, or alternatively, detection module 225 may detect modification of an existing file at one of the one or more cloud storage systems. Detection module 225 may detect creation of a new file and/or modification of an existing file via a notification callback API provided by one of the one or more cloud storage systems. Accordingly, detection module 225 may enable identification module 205 to identify sensitive data in a timely manner via the notification callback API. Thus, in conjunction with the detection module 225, identification module 205 may identify sensitive data in association with the timely detection of the creation of a new file. Similarly, identification module 205 may identify sensitive data in association with the timely detection of the modification of an existing file.

In some embodiments, data module 210 may copy a portion of "file.doc" and save the copied portion in a file (e.g., "file-portion.doc") at the second storage system. Data module 210 may delete the copied portion from "file.doc" at the first storage system. As one example, "file.doc" may contain three segments of text. Identification module 205 may identify the second segment as containing sensitive information, while the first and third segments are identified as not containing sensitive information. Accordingly, data module 210 may copy the second segment and save the copied second segment in a new file, "file-portion.doc," at the second storage system. Data module 210 may delete the second segment from "file.doc" at the first storage system and linking module 215 may replace the deleted second segment with a virtual symbolic link. Thus, linking module 215 may store within "file.doc" at the first storage system a virtual symbolic link. This virtual symbolic link may point to the copied second segment portion of "file.doc" that is saved to the file "file-portion.doc" at the second storage system. Thus, in some embodiments, the virtual symbolic link may be stored within the file "file.doc" at the first storage system. In one embodiment, the virtual symbolic link may include a uniform resource identifier (URI). This URI may include a uniform resource name (URN) and/or a uniform resource locator (URL). The URI may be stored as characters within "file.doc" at the first storage system. The stored characters may form an active link to the transferred portion of data at the second storage system (e.g., hyperlink, HTML link, etc.). In one embodiment, the URI stored in the original file "file.doc" may include one or more URL parameters that specify file information, content information, and/or location information regarding the transferred portion of data, the new file that stores the transferred portion of data, and the second storage system where the new file is stored. Thus, a user may click on the link within "file.doc" in order to access the copied second segment portion of "file.doc" saved in file "file-portion.doc." In some cases, data module 210 may transfer all of the data within "file.doc" at the first storage system to a new file "new-file.doc" at the second storage system and delete the content within "file.doc," leaving an empty file. Linking module 215 may replace the copied and deleted content of "file.doc" with a URI that points to "new-file.doc" at the second storage system. In some cases, upon identifying a file containing only a URI and no other data, the data protection module 130-a may query a user whether to replace the file with the URI with a virtual symbolic link. If the user agrees, the data protection module 130-a may access the directory containing the file with the URI, place a virtual symbolic link in that folder, and delete the file with the URI, thus enabling a user to access the secure data by clicking on the virtual symbolic link directly instead of having to open the file and then click on the URI within the file. Alternatively, the user may retain the file with the URI in order to add data to that file.

Figure 3:
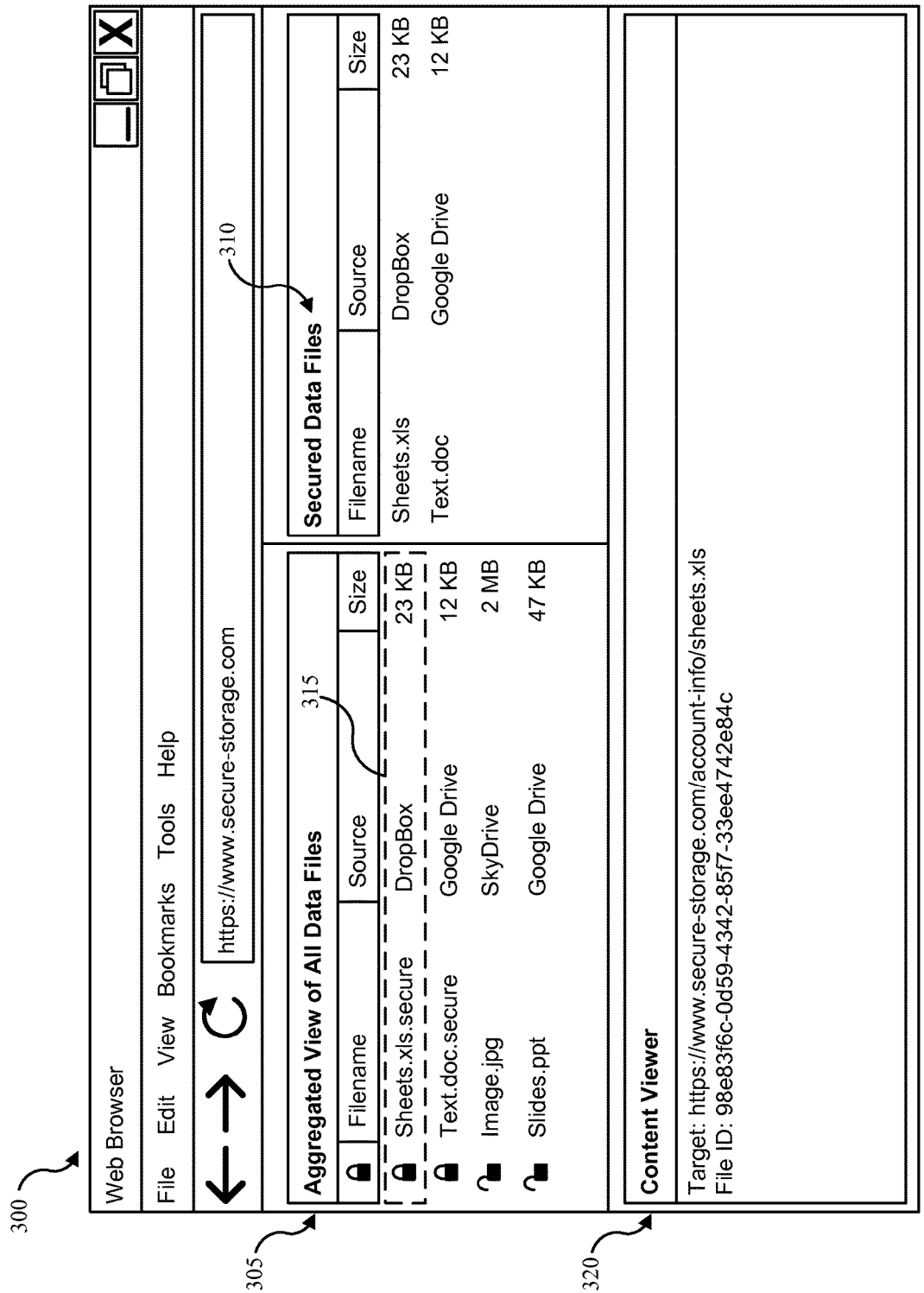
FIG. 3 is a block diagram illustrating one example of an application in which the present systems and methods may be implemented.

FIG. 3 is a block diagram illustrating one example of an application 300 in which the present systems and methods may be implemented. In some configurations, operations associated with the application 300 may be implemented by the data protection module 130 illustrated in FIGS. 1 and/or 2. In some configurations, the operations associated with the application 300 may be implemented in conjunction with an application and/or a user interface of device 105 and/or server 115 in FIG. 1. In some embodiments, application 300 may be one example of application 135 of FIG. 1.

In certain embodiments, application 300 may include any combination of a web browser (as illustrated), a web-based application, a program installed on a server (e.g., server 115), a program installed on a personal computer (e.g., device 105), and/or a mobile application installed on a mobile computing device (e.g., device 105). Application 300 may display an aggregated view 305 of data from multiple cloud storage systems such as data from DropBox, Google Drive, SkyDrive, etc. As illustrated, the aggregated view 305 may display information regarding unprotected and protected files on the multiple cloud storage systems. In one embodiment, the aggregated view 305 may include a protection symbol to indicate whether a file is protected. As illustrated, data protection module 130 may display a locked padlock to indicate files that are currently protected on a secure storage system, and an unlocked padlock to indicate files that currently remain unprotected. The aggregated view 305 may indicate the source of the files (e.g., Google Drive, DropBox, SkyDrive, etc.), and other file information such as filename and file size. Application 300 may also display a view 310 of the content of the secure storage location. As illustrated, the view of the secure data files 310 may include information of files that are currently protected. The view 310 may include information regarding the protected files such as filename, source, file size, etc.

In some embodiments, application 300 may allow a user to select a file from the aggregated view 305 and/or the secure data files view 310. As illustrated, a user may select a file in the aggregated view 305, where a selected file 315 in the example illustration may include a .XLS spreadsheet file named "Sheets.xls.secure." The selected file 315 may depict a virtual symbolic link or linking file associated with a file originally located at the indicated source location, which in this case is DropBox. In one configuration, application 300 may include a content viewer 320. The content viewer 320 may display information regarding a selected file. Accordingly, as depicted, content viewer 320 may display information regarding selected file 315. As illustrated, content viewer 320 may indicate that selected file 315 includes information regarding a protected file stored on the secure storage system. FIG. 3 depicts the selected file 315 representing a virtual symbolic link to the file "Sheets.xls" stored on the secure storage location as indicated in the secure data files view 310. The selected file 315 may include information regarding the target file, "Sheets.xls," stored on the secure storage location and a file ID associated with "Sheets.xls." As illustrated, the file ID may include a globally unique identifier (GUID). The selected file 315 may include additional information not illustrated in FIG. 3, including information regarding file source information (e.g., where the file was created, file owner, etc.), file type, file content, file metadata, file creation data, target file information, target volume, etc. Accordingly, a user may be enabled to protect all of their data across multiple cloud storage systems in a secure and protected environment.

Figure 4:
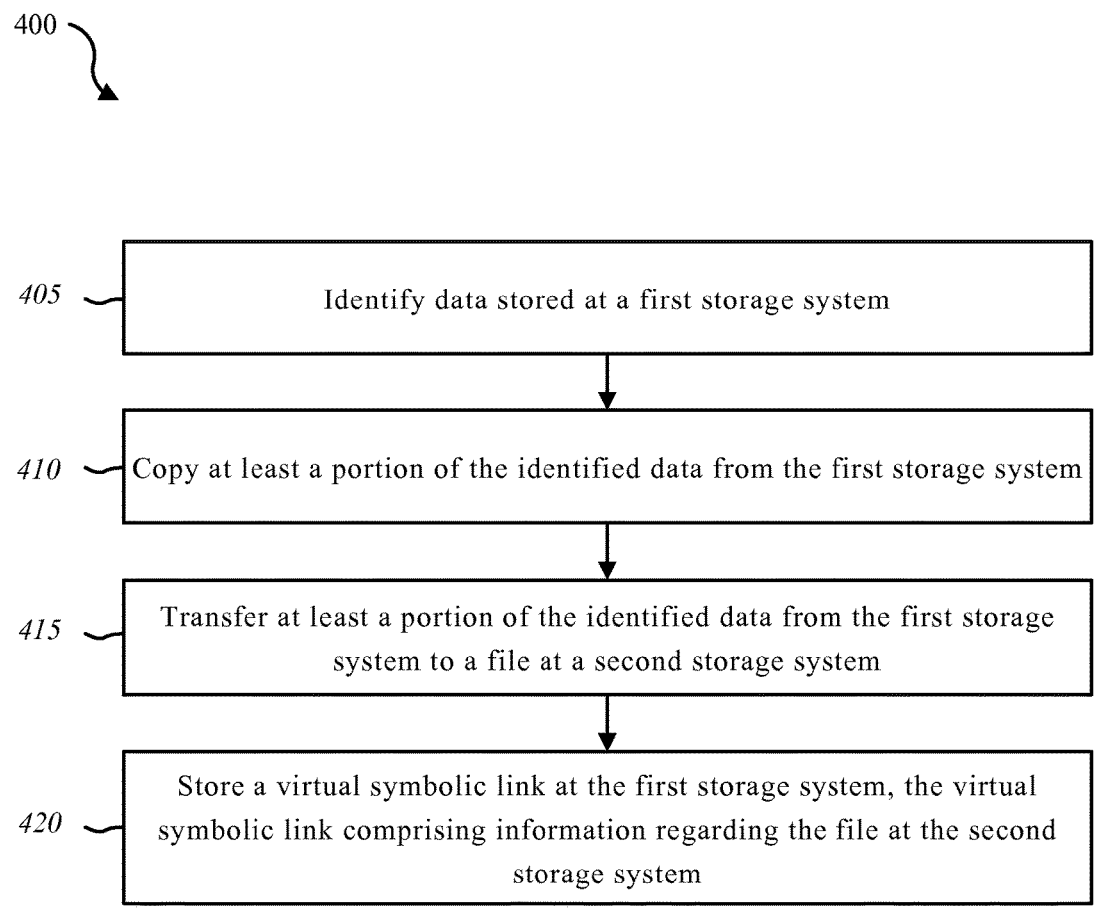
FIG. 4 is a flow diagram illustrating one embodiment of a method for protecting sensitive data.

FIG. 4 is a flow diagram illustrating one embodiment of a method 400 for protecting sensitive data. In some configurations, the method 400 may be implemented by the data protection module 130 illustrated in FIGS. 1 and/or 2. In some configurations, the method 400 may be implemented in conjunction with application 135 and/or a user interface of device 105 in FIG. 1.

At block 405, data stored at a first storage system may be identified. The data may be classified as sensitive data. At block 410, at least a portion of the identified data may be copied from the first storage system. At block 415, at least a portion of the identified data may be transferred from the first storage system to a file at a second storage system. At block 420, a virtual symbolic link may be stored at the first storage system. The virtual symbolic link may include information regarding the file at the second storage system. In some cases, the portion transferred from the first storage system to the file at the second storage system may be deleted from the first storage system. Thus, the virtual symbolic link may replace the content transferred from the first storage system to the second storage system, and dynamically link to the content moved to the second storage system.

Figure 5:
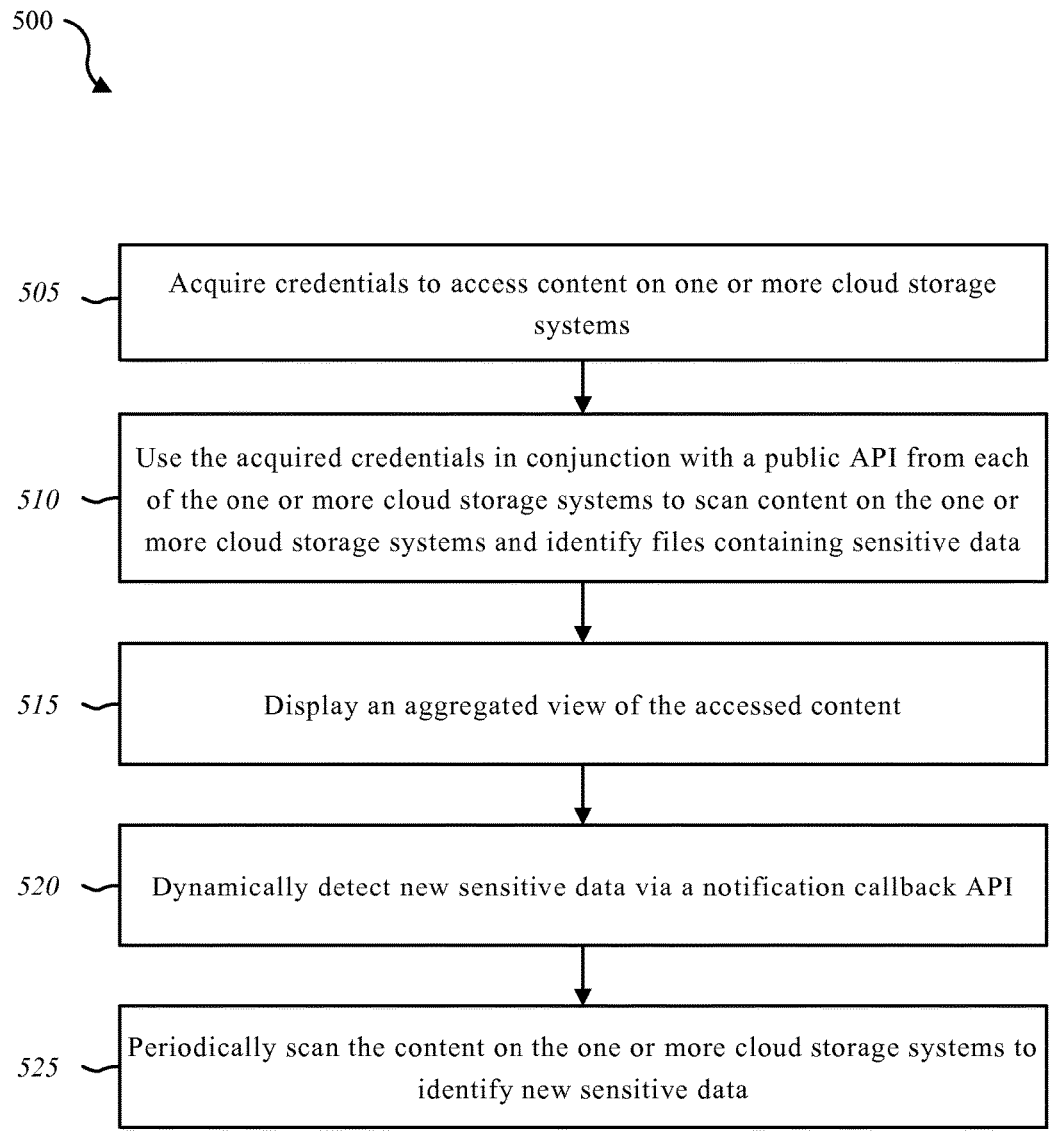
FIG. 5 is a flow diagram illustrating another embodiment of a method for protecting sensitive data.

FIG. 5 is a flow diagram illustrating another embodiment of a method 500 for protecting sensitive data. In some configurations, the method 500 may be implemented by the data protection module 130 illustrated in FIGS. 1 and/or 2. In some configurations, the method 500 may be implemented in conjunction with application 135 and/or a user interface of device 105 in FIG. 1.

At block 505, credentials may be acquired to access content on one or more cloud storage systems. At block 510, the acquired credentials may be used in conjunction with a public API from each of the one or more cloud storage systems to scan content on the one or more cloud storage systems and identify files containing sensitive data. At block 515, an aggregated view of the accessed content may be displayed. The aggregated view may enable a user to simultaneously view content from each of the one or more cloud storage systems, to visually determine which files are protected and which files are not protected, and to manually protect unprotected files. At block 520, new sensitive data may be dynamically detected via a notification callback API. Accordingly, creation of a new file at one of the one or more cloud storage systems may be detected as well as modification of an existing file at one of the one or more cloud storage systems. At block 525, the content on the one or more cloud storage systems may be periodically scanned to identify new sensitive data.

Figure 6:
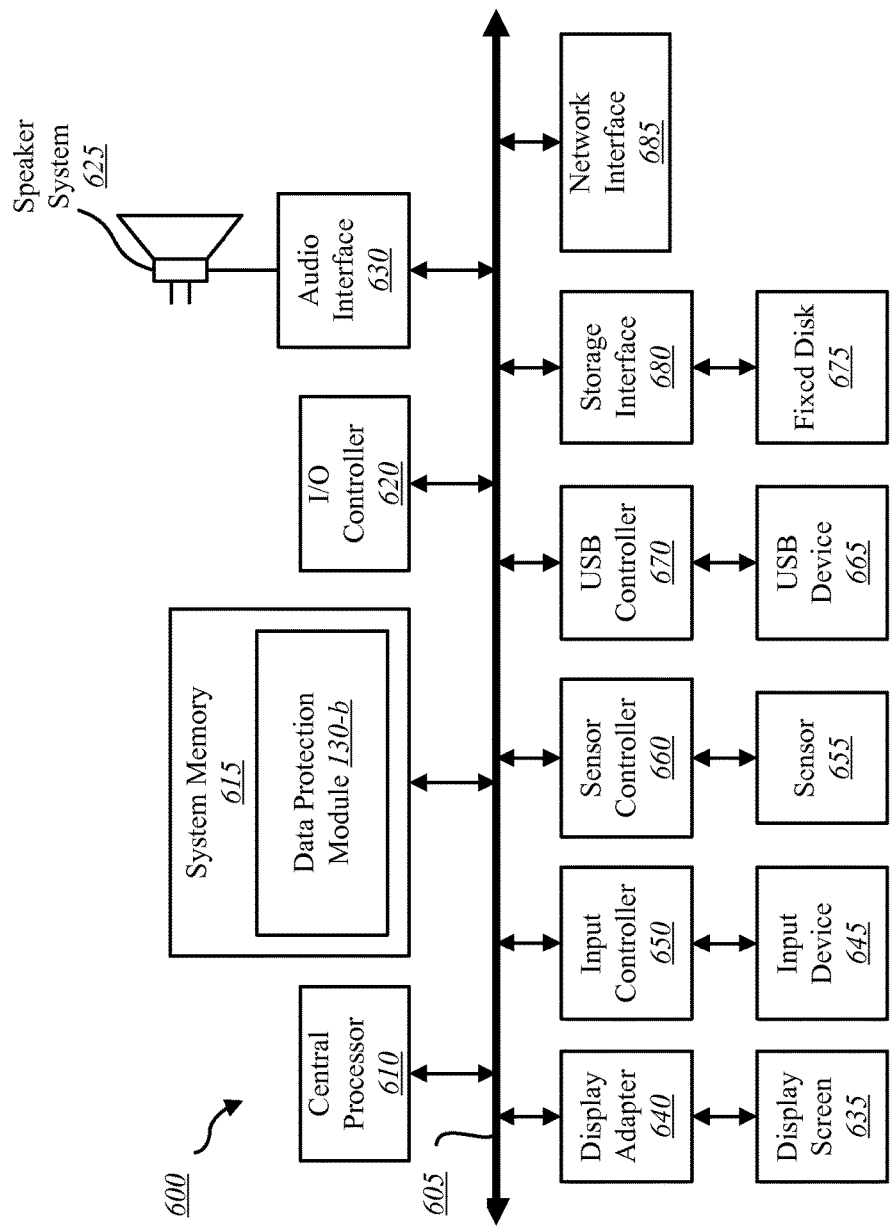
FIG. 6 depicts a block diagram of a computer system suitable for implementing the present systems and methods.

FIG. 6 depicts a block diagram of a controller 600 suitable for implementing the present systems and methods. The controller 600 may be an example of device 105, intermediary network device 120, and/or server 115 illustrated in FIG. 1. In one configuration, controller 600 includes a bus 605 which interconnects major subsystems of controller 600, such as a central processor 610, a system memory 615 (typically RAM, but which may also include ROM, flash RAM, or the like), an input/output controller 620, an external audio device, such as a speaker system 625 via an audio output interface 630, an external device, such as a display screen 635 via display adapter 640, an input device 645 (e.g., remote control device interfaced with an input controller 650), multiple USB devices 665 (interfaced with a USB controller 670), and a storage interface 680. Also included are at least one sensor 655 connected to bus 605 through a sensor controller 660 and a network interface 685 (coupled directly to bus 605).

Bus 605 allows data communication between central processor 610 and system memory 615, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the data protection module 130-*b* to implement the present systems and methods may be stored within the system memory 615. Applications resident with controller 600 are generally stored on and accessed via a non-transitory computer readable medium, such as a hard disk drive (e.g., fixed disk 675) or other storage medium. Additionally, applications can be in the form of electronic signals modulated in accordance with the application and data communication technology when accessed via interface 685.

Storage interface 680, as with the other storage interfaces of controller 600, can connect to a standard computer readable medium for storage and/or retrieval of information, such as a fixed disk drive 675. Fixed disk drive 675 may be a part of controller 600 or may be separate and accessed through other interface systems. Network interface 685 may provide a direct connection to a remote server via a direct network link to the Internet via a POP (point of presence). Network interface 685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 600 wirelessly via network interface 685.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 6 need not be present to practice the present systems and methods. The devices and subsystems can be interconnected in different ways from that shown in FIG. 6. The aspect of some operations of a system such as that shown in FIG. 6 are readily known in the art and are not discussed in detail in this application. Code to implement the present disclosure can be stored in a non-transitory computer-readable medium such as one or more of system memory 615 or fixed disk 675. The operating system provided on controller 600 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 7:
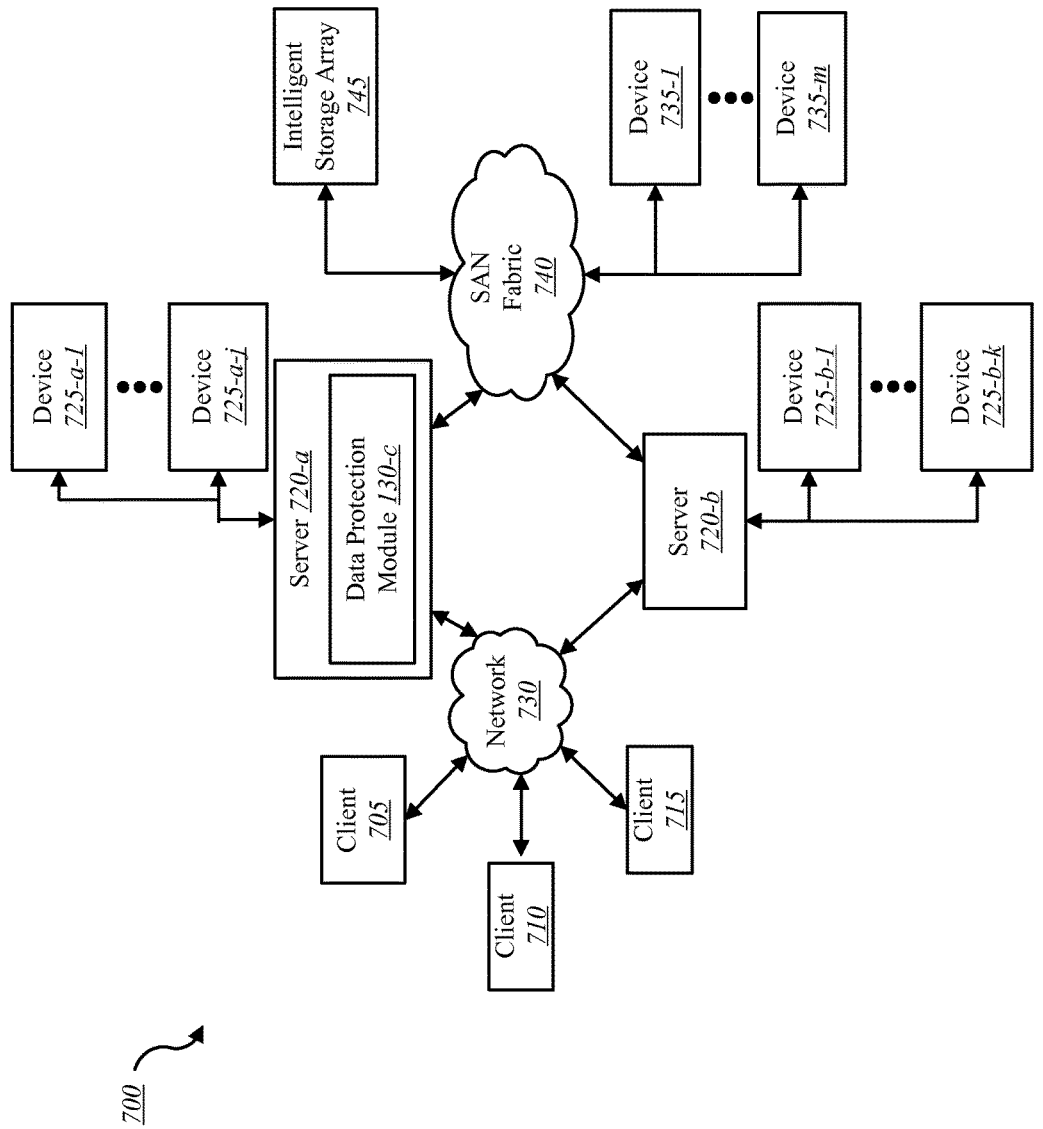
FIG. 7 is a block diagram depicting a network architecture in which client systems, as well as storage servers (any of which can be implemented using the computer system).

FIG. 7 is a block diagram depicting a network architecture 700 in which client systems 705, 710 and 715, as well as storage servers 720-*a* and 720-*b* (any of which can be implemented using computer system 600), are coupled to a network 730. In one embodiment, data protection module 130-*c* may be located within one of the storage servers 720-*a*, 720-*b* to implement the present systems and methods. Data protection module 130-*c* may be one example of data protection module 130 depicted in FIGS. 1, 2, and/or 6. The storage server 720-*a* is further depicted as having storage devices 725-*a*-1 through 725-*a*-*j* directly attached, and storage server 720-*b* is depicted with storage devices 725-*b*-1 through 725-*b*-*k* directly attached. SAN fabric 740 supports access to storage devices 735-1 through 735-*m* by storage servers 720-*a* and 720-*b*, and so by client systems 705, 710 and 715 via network 730. Intelligent storage array 745 is also shown as an example of a specific storage device accessible via SAN fabric 740.

With reference to computer system 600, network interface 685 or some other method can be used to provide connectivity from each of client computer systems 705, 710 and 715 to network 730. Client systems 705, 710 and 715 are able to access information on storage server 720-*a* or 720-*b* using, for example, a web browser or other client software (not shown). Such a client allows client systems 705, 710 and 715 to access data hosted by storage server 720-*a* or 720-*b* or one of storage devices 725-*a*-1 -725-*a*-*j*, 725-*b*-1-725-*b*-*k*, 735-1-735-*m* or intelligent storage array 745. FIG. 7 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to explain the principles of the present systems and methods and their practical applications, to enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer-implemented method for protecting sensitive data, comprising:

identifying data within a first file stored at a first storage system, a portion of the identified data being classified as sensitive data and being configured in an original file format;

copying the portion of the identified data classified as sensitive data from the first storage system;

transferring the copied portion of the identified data from the first storage system to a second file stored at a second storage system;

deleting the copied portion of the identified data from within the first file stored at the first storage system; and replacing the deleted portion with a virtual symbolic link within the first file stored at the first storage system, the virtual symbolic link being configured in a proprietary file format and comprising an active link to the second file stored at the second storage system, wherein selecting the active link provides access to the second file stored at the second storage system.

2. The method of claim 1, further comprising:
acquiring credentials to one or more cloud storage systems, the first storage system being among the one or more cloud storage systems; and
using the acquired credentials in conjunction with a public application programming interface (API) from the one or more cloud storage systems to access content on the one or more cloud storage systems.

3. The method of claim 2, further comprising:
scanning the content on the one or more cloud storage systems to identify files containing sensitive data.

4. The method of claim 2, further comprising:
upon accessing the content from each of the one or more cloud storage systems, displaying an aggregated view of the accessed content.

5. The method of claim 2, further comprising:
periodically scanning the content on the one or more cloud storage systems to identify new sensitive data.

6. The method of claim 2, further comprising:
detecting, via a notification callback API, creation of new data at one of the one or more cloud storage systems; and
detecting sensitive data in the new data.

7. The method of claim 1, further comprising:
registering an application as a handler of the proprietary file format.

8. A computing device configured for protecting sensitive data, comprising:
a processor;
memory in electronic communication with the processor;
instructions stored in the memory, the instructions being executable by the processor to:
identify data within a first file stored at a first storage system, a portion of the identified data being classified as sensitive data and being configured in an original file format;
copy the portion of the identified data classified as sensitive data from the first storage system;
transfer the copied portion of the identified data from the first storage system to a second file stored at a second storage system;
delete the copied portion of the identified data from within the first file stored at the first storage system; and
replace the deleted portion with a virtual symbolic link within the first file stored at the first storage system, the virtual symbolic link being configured in a proprietary file format and comprising an active link to the second file stored at the second storage system, wherein selecting the active link provides access to the second file stored at the second storage system.

9. The computing device of claim 8, wherein the instructions are executable by the processor to:
acquire credentials to one or more cloud storage systems; and
use the acquired credentials in conjunction with a public application programming interface (API) from the one or more cloud storage systems to access content on the one or more cloud storage systems.

10. The computing device of claim 9, wherein the instructions are executable by the processor to:
scan the content on the one or more cloud storage systems to identify files containing sensitive data.

11. The computing device of claim 9, wherein the instructions are executable by the processor to:
upon accessing the content from each of the one or more cloud storage systems, display an aggregated view of the accessed content.

12. The computing device of claim 9, wherein the instructions are executable by the processor to:
periodically scan the content on the one or more cloud storage systems to identify new sensitive data.

13. The computing device of claim 9, wherein the instructions are executable by the processor to:
detect, via a notification callback API, creation of new data at one of the one or more cloud storage systems; and
detect sensitive data in the new data.

14. A computer-program product for protecting sensitive data, by a processor, the computer-program product comprising a non-transitory computer-readable medium storing instructions thereon, the instructions being executable by the processor to:
identify data within a first file stored at a first storage system, a portion of the identified data being classified as sensitive data and being configured in an original file format;
copy the portion of the identified data classified as sensitive data from the first storage system;
transfer the copied portion of the identified data from the first storage system to a second file stored at a second storage system;
delete the copied portion of the identified data from within the first file stored at the first storage system; and
replace the deleted portion with a virtual symbolic link within the first file stored at the first storage system, the virtual symbolic link being configured in a proprietary file format and comprising an active link to the second file stored at the second storage system, wherein selecting the active link provides access to the second file stored at the second storage system.

15. The computer-program product of claim 14, wherein the instructions are executable by the processor to:
acquire credentials to one or more cloud storage systems; and
use the acquired credentials in conjunction with a public application programming interface (API) from the one or more cloud storage systems to access content on the one or more cloud storage systems.

* * * * *